United States Patent
Langston et al.

(10) Patent No.: US 10,091,067 B2
(45) Date of Patent: Oct. 2, 2018

(54) DISCOVERING AND PUBLISHING DEVICE CHANGES IN A CLOUD ENVIRONMENT

(71) Applicant: International Business Machines Corporation, Armonk, NY (US)

(72) Inventors: Bryan S. Langston, Firestone, CO (US); Mohamed Mohamed, San Jose, CA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 14/960,272

(22) Filed: Dec. 4, 2015

(65) Prior Publication Data
US 2017/0163488 A1    Jun. 8, 2017

(51) Int. Cl.
*G06F 15/173* (2006.01)
*H04L 12/24* (2006.01)
(Continued)

(52) U.S. Cl.
CPC ........ *H04L 41/12* (2013.01); *G06F 17/30097* (2013.01); *G06F 17/30949* (2013.01); *H04L 43/02* (2013.01); *H04L 43/04* (2013.01); *H04L 45/02* (2013.01); *H04L 67/10* (2013.01); *H04L 67/26* (2013.01)

(58) Field of Classification Search
CPC .............. G06F 17/30; G06F 17/30097; G06F 17/30286; G06F 17/3033; G06F 17/30628; G06F 17/30949; H04L 67/1061; H04L 43/00–43/02; H04L 43/04; H04L 43/08–43/0817; H04L 41/12; H04L 45/00–45/02; H04W 84/02; H04W 84/10
See application file for complete search history.

(56) References Cited

U.S. PATENT DOCUMENTS 7,385,938 B1   6/2008   Beckett et al.
8,473,462 B1   6/2013   Banerjee
(Continued)

OTHER PUBLICATIONS

Paterno, F. et al., "A Logical Framework for Multi-Device User Interfaces", Proceedings of the 4th ACM SIGCHI Symposium on Engineering interactive computing systems (EICS'12), Jun. 25, 2012, pp. 45-50, ACM, United States.
(Continued)

*Primary Examiner* — Brendan Higa
(74) *Attorney, Agent, or Firm* — Sherman IP LLP; Kenneth L. Sherman; Steven Laut (57) ABSTRACT

A method for discovering and publishing device changes in a cloud computing environment. The method includes scanning, by a processor, a computing environment to detect a multiple computing elements. The processor generates an index data structure including allocation of nodes that each represent a computing element of the multiple computing elements. The nodes each include a computed hash value that includes computing element status of the node and status of associated child nodes. The index data structure is monitored for discovering a change in status of any of the nodes. In response to determining a change in status of any of the nodes, the index data structure is re-generated and the hash value for each node associated with the change in status is re-computed. An updated status of one or more of the nodes is provided based on the change in status.

20 Claims, 7 Drawing Sheets

(51) Int. Cl.
    *H04L 29/08*     (2006.01)
    *G06F 17/30*     (2006.01)
    *H04L 12/751*     (2013.01)
    *H04L 12/26*     (2006.01)

(56) References Cited

U.S. PATENT DOCUMENTS

| | | |
|---|---|---|
| 8,701,182 B2 | 4/2014 | Bhargava et al. |
| 8,838,639 B2 | 9/2014 | Sekiguchi et al. |
| 2005/0114479 A1 | 5/2005 | Watson-Luke |
| 2009/0222540 A1 | 9/2009 | Mishra et al. |
| 2014/0237595 A1 | 8/2014 | Sridhara et al. |

OTHER PUBLICATIONS

Routray, R. et al., "CIMDIFF: Advanced difference tracking tool for CIM compliant devices", Proceedings of the 23rd Large Installation System Administration Conference (LISA '09), Nov. 1, 2009, pp. 145-157, USENIX Association, United States.

Mell, P., et al., "The NIST Definition of Cloud Computing", National Institute of Standards and Technology Special Publication 800-145, Sep. 2011, pp. 1-7, U.S. Department of Commerce, United States.

List of IBM Patents or Patent Applications Treated As Related, Langston, B. et al., U.S. Appl. No. 16/019,271, filed Jun. 26, 2018.

DISCOVERING AND PUBLISHING DEVICE
CHANGES IN A CLOUD ENVIRONMENT

BACKGROUND

Compared to traditional on-premise computing environments, cloud computing environments have relatively dynamic compute resources, such as servers and switches. As servers are provisioned, switches become part of the information technology (IT) environment. As servers are decommissioned, so are the switches. Providing reliable managed IT services in such a dynamic environment poses unique challenges compared to traditional, static IT environments.

Traditional IT environments typically have a Configuration Management Database (CMDB) that serves as a system of record for services and assets being supported by various service providers. Through change management processes and service tickets, assets are added and removed from the CMDB. Device identity properties such as hostname and IP address are typically known in advance of device deployment and are part of the change record.

SUMMARY

Embodiments of the invention relate to discovering and publishing device changes in a cloud computing environment. In one embodiment, a method includes scanning, by a processor, a computing environment to detect a multiple computing elements. The processor generates an index data structure including allocation of nodes that each represent a computing element of the multiple computing elements. The nodes each include a computed hash value that includes computing element status of the node and status of associated child nodes. The index data structure is monitored for discovering a change in status of any of the nodes. In response to determining a change in status of any of the nodes, the index data structure is re-generated and the hash value for each node associated with the change in status is re-computed. An updated status of one or more of the nodes is provided based on the change in status.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email).

The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
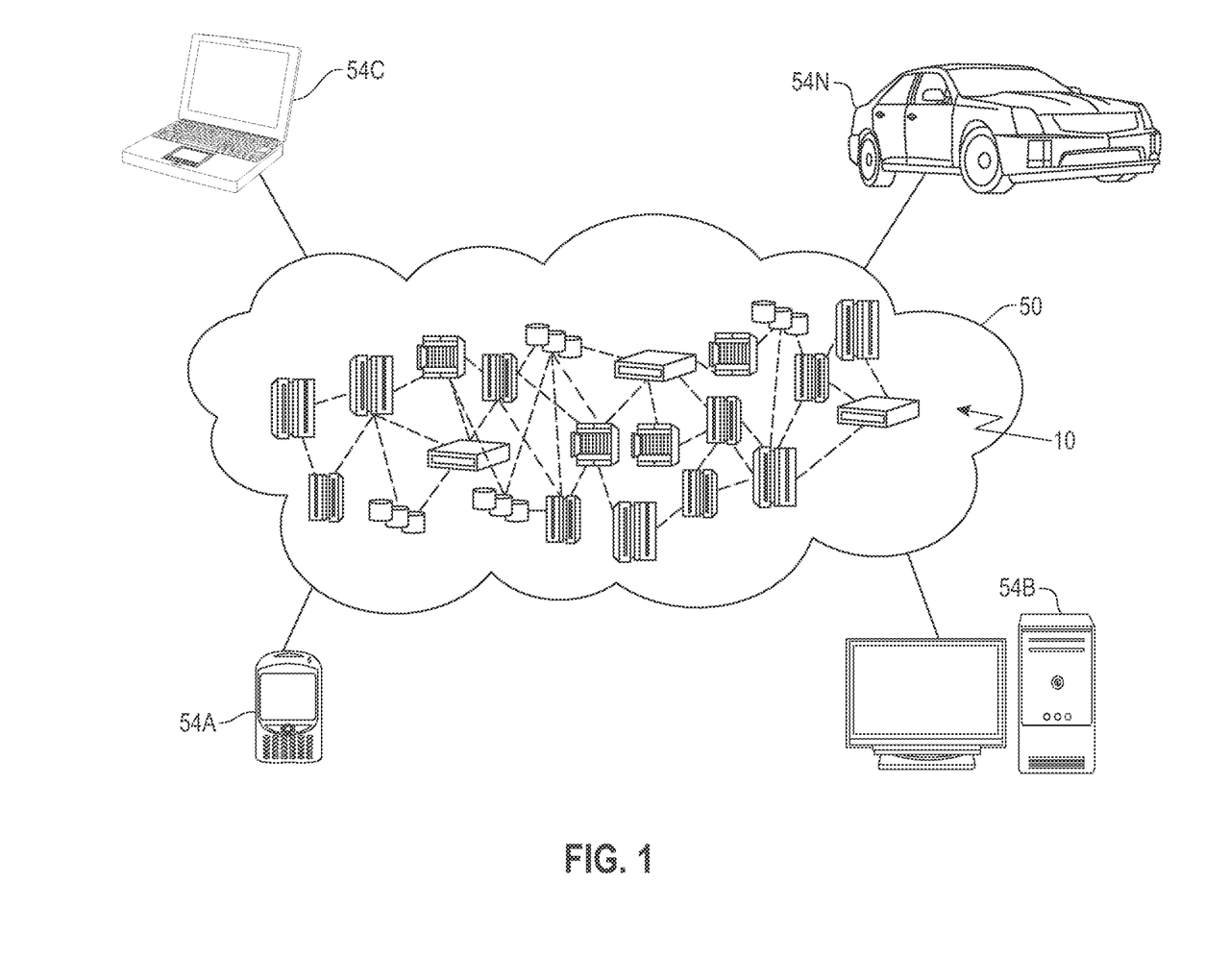
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
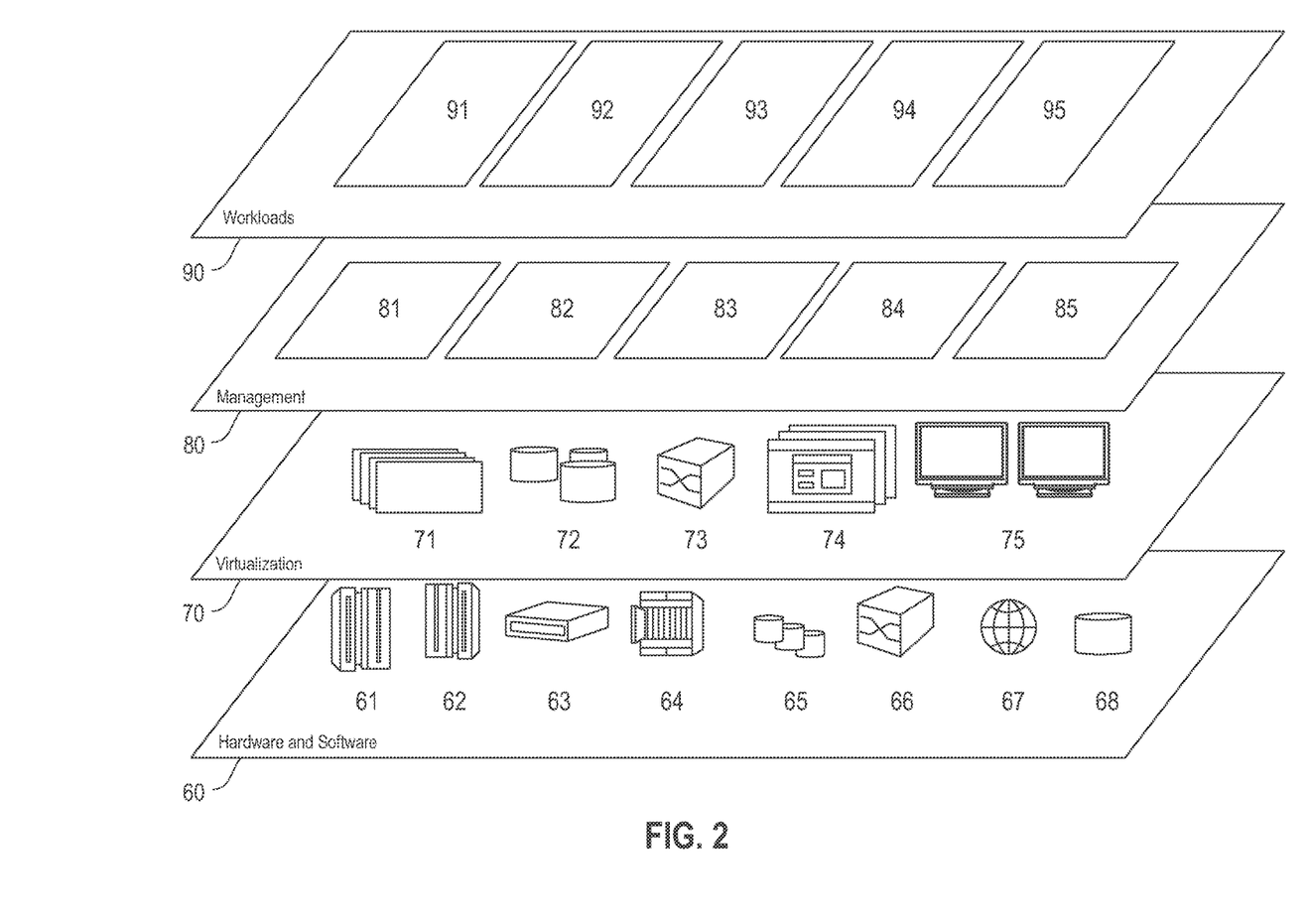
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed by the processing system 300, or performed using the index data structure 400, which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
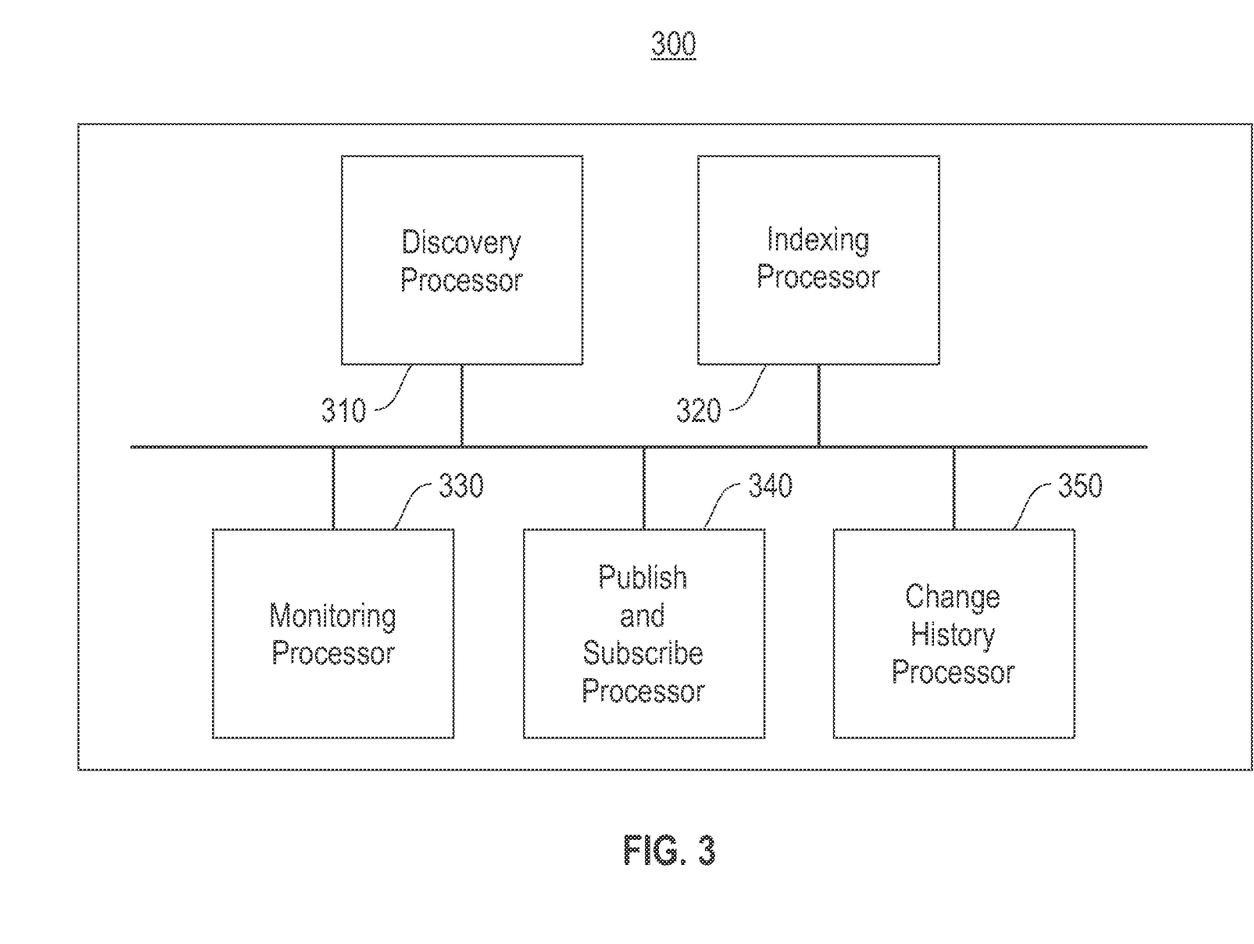
FIG. 3 is a block diagram illustrating a processing system for discovering and publishing device changes in a cloud computing environment, according to an embodiment of the present invention.

FIG. 3 illustrates a processing system 300 for discovering and publishing device changes in a cloud computing environment, in accordance with one embodiment. In one embodiment, the processing system 300 includes a discovery processor 310, an indexing processor 320, a monitoring processor 330, a publish and subscribe processor 340 and a change history processor 350. In one embodiment, the processing system 300 is connected with one or more memory devices (e.g., storage disk devices, storage systems, distributed file systems, cloud-based storage systems, etc.).

In one embodiment, the discovery processor 310 scans a computing environment (e.g., a cloud computing environment; a datacenter, etc.) to detect computing devices for one or more customers (e.g., entities, other processing environments, etc.). In one embodiment, the indexing processor 320 generates an index data structure (e.g., an index tree data structure) with an allocation of nodes that each represent a computing device. In one example embodiment, the nodes each include a computed hash value including computing device status of the node, status of associated child nodes, and a history structure. In one embodiment, the nodes each include a list of hash values of related child nodes.

In one embodiment, the monitoring processor 330 monitors the index data structure to discover a change in status of any of the nodes. In one embodiment, the change history processor 350 re-generates the index data structure and re-computes the hash value for each associated node in response to a change in status for any of the nodes. In one embodiment, the publish and subscribe processor 340 provides an updated status of one or more of the nodes based on the change in status for any of the nodes.

In one embodiment, the change history processor 340 propagates changes in status of any computing device between associated node levels of the index data structure using a representational state transfer (REST) application programming interface (API). Each propagation of a status change to an upper node level from a lower node level (of the index data structure) triggers a new computation of a hash value for any node in the upper node level. The change history processor 350 stores a last hash value and history of prior hash values that lead up to the last hash value in the history structure.

In one embodiment, the computational devices comprise one or more servers, one or more routers and one or more switches. In one embodiment, the monitoring processor 330 tracks status changes of the computational devices. In one embodiment, the publish and subscribe processor 340 publishes status change notifications based on a notification subscription or to provide status change notifications for pulling (by customers with access privileges for the change notifications). Status change notifications may include any granularity of a node or level of nodes for the index data structure.

In one embodiment, the indexing processor 320 generates index data structures for each customer of the cloud computing environment. The publish and subscribe processor 340 provides updated change status based on an associated index data structure to each customer of the cloud computing environment.

In one example, a customer may include a security services provider that is interested in the changes that occur at the server level. An SLA service provider might be interested in the changes at any of the device levels, depending on the SLA definition and the methodology used to measure individual service level objectives (SLOs). In one embodiment, hash trees are used as the index data structure to compute a hash of each device in a customer's cloud environment as well as a hash of collections or groupings of related devices. In one example, a switch is related to one or more connected servers. Rack switches are related to one or more aggregation switches. Multiple aggregation switches are related to a router. Status changes are published from one node level to another. Any status change triggers the re-calculation of one or more hash values. In one embodiment, verifying the hash values allows avoiding any non-necessary queries to lower level nodes (resources).

Figure 4:
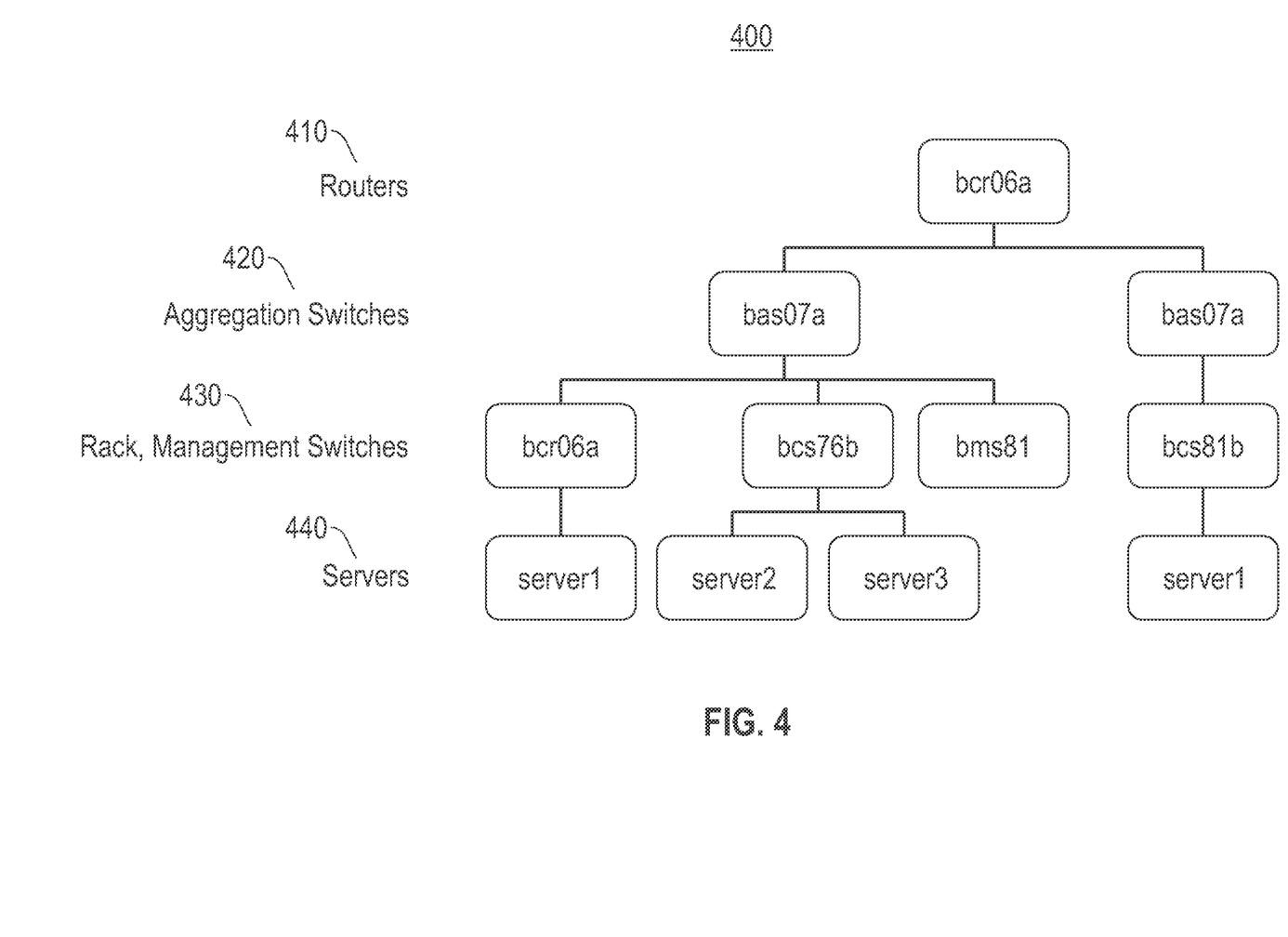
FIG. 4 shows an example of devices in a cloud environment, according to an embodiment.

FIG. 4 shows an example of devices in a cloud environment 400, according to an embodiment. In one example, the cloud environment 400 includes a router level 410, aggregation switch level 420, rack, management switch level 430 and server level 440. As shown, the devices in the cloud environment may have associations depicted by the connecting lines. For example, the router bcr06a is connected to an aggregation switch bas07a that is connected to rack, management switches bcr06a, bcs76b and bms81, where switch bcr06a is connected to server 1 and bcs76b is connected to servers 2 and 3. In another example, router bcr06a is connected to aggregation switch bas07a that is connected to rack, management switches bcs81b, which is connected to server 1.

In one embodiment, the cloud environment 400 may be associated with a particular customer. In one embodiment, using processing system 300, the particular customer can discover device status with different granularities (e.g., at different node levels and at different nodes). In one embodiment, each node calculates a value for its status and propagates this value to the upper level. Each node status depends on its status as well as the status of its children nodes. A publish-subscribe protocol links the different nodes in the cloud computing environment 400.

Figure 5:
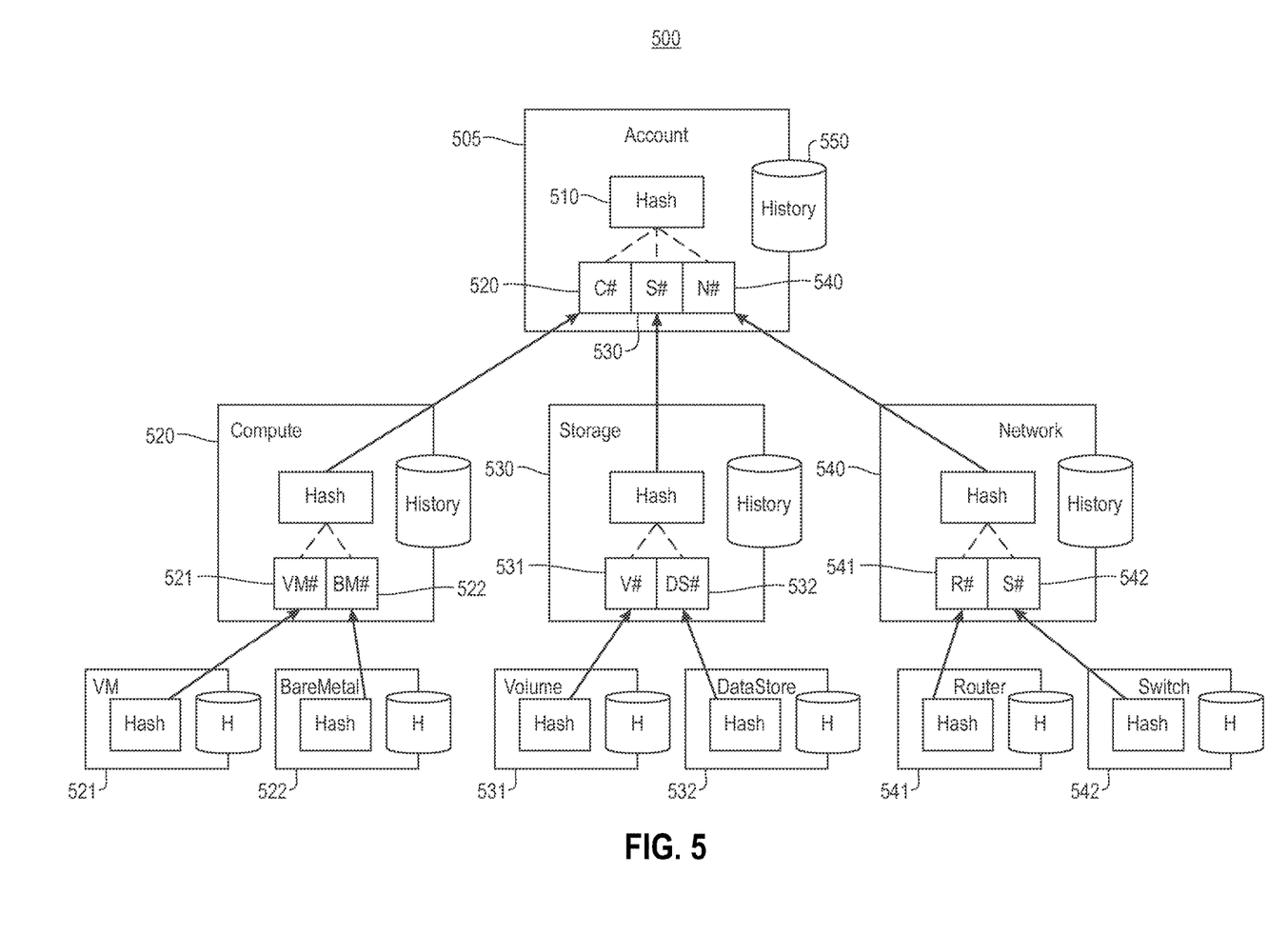
FIG. 5 is a block diagram illustrating an index hash tree depiction of a cloud environment for a particular customer account, according to an embodiment.

FIG. 5 is a block diagram illustrating a hash tree depiction of an example cloud environment 500 for a particular customer account, according to an embodiment. In one embodiment, in order to have an efficient process of monitoring on customers' cloud environment devices, a hash tree for each customer is provided that represents the status of the resources in the customer's cloud environment. A hash tree data structure is allocated for each customer. The hash tree data structure is organized as a hierarchy, where the upper level (parent node) has an overview on the status of the lower level (children nodes). Monitoring the status of the cloud environment may be performed in different granularities. In one example, the overall status can be directly obtained from the root node (e.g., root node 505) of the hash tree data structure, or any particular type of resource in the different levels of the hash tree data structure may be targeted. Changes of status of the devices that are represented at each node are published from lower node levels to higher node levels through a standardized REST API.

In one embodiment, the root of the tree 505 contains the overall status of the (customer) cloud environment 500. Each node 505, 520, 530, 540, 521, 522, 531, 532, 541 and 542 contains the status of the sub-tree represented by its children (if any), and represents a device or devices in the example cloud environment 500 (e.g., server(s), router(s), switch(es), storage device(s), hypervisor(s), etc). A change in a device is reflected in a lower level node itself as well as in the upper node levels. In the example cloud environment 500, the root node 505 for a particular customer account includes the (computed) hash value 510 for itself and the children nodes 520 (computing node), 530 (storage node)

and 540 (network node). The history structure 550 is also part of the root node's 505 structure.

In the node level below the root node 505, the node 520 (computing node) includes a hash value for itself and the children nodes 521 (virtual machine (VM) node) and node 522 (bare-metal (BM) node), along with a history structure. Node 530 (storage node) includes a hash value for itself and the children nodes 531 (volume node) and 532 (data store node), along with a history structure. Node 540 (network node) includes a hash value for itself and the children nodes 541 (router node) and 542 (switch node), along with a history structure.

In the second node level below the root node 505, the node 521 (VM node) does not have any children nodes, and includes a hash value for itself, and a history structure. The node 522 (BM node) does not have any children nodes, and includes a hash value for itself, and a history structure. The node 531 (volume node) does not have any children nodes, and includes a hash value for itself, and a history structure. The node 532 (data store node) does not have any children nodes, and includes a hash value for itself, and a history structure. The node 541 (router node) does not have any children nodes, and includes a hash value for itself, and a history structure. The node 542 (switch node) does not have any children nodes, and includes a hash value for itself, and a history structure.

In one embodiment, the behavior of a node at the reception of a monitoring query (e.g., by the monitoring processor 330, FIG. 3) is reflected by the pseudo code listed below:

```
Function getChanges(node)
    If (Hash== Hash value in the History)
    Then return "There is no change"
    Else verify Change cause in History
    If cause is local
    Then return changes from History
    Else if cause in children
       For each modified child
       changes = getChanges(modified child)
       End
          Return changes
       End
    End Function
```

As shown in the pseudo code above, on the reception of a monitoring query, the process starts by verifying the hash value. If the hash value is different from the last value saved in the history structure, which means that there is no change in the hash tree data structure, the last value is returned and there is no need to further traverse the hash tree data structure. Otherwise, the cause of the change is verified, and three cases are distinguished from one another as follows. In one embodiment, the first case represented when the change is caused by a local change in the node itself. In this first case, it is just required to send this new change and there is no need to further traverse other parts of the hash tree data structure. In one embodiment, the second case is when the change is from a change on the status of one or more children nodes. In this case, it is required to loop over the changed nodes and recursively apply the same process to obtain all the status changes. In one embodiment, the third case is a mixed case. This case results when the status change is from a local status change and a status change on one or more children nodes. In this case the returned status change is the combination of local and children node status changes as described for the first two cases.

Figure 6:
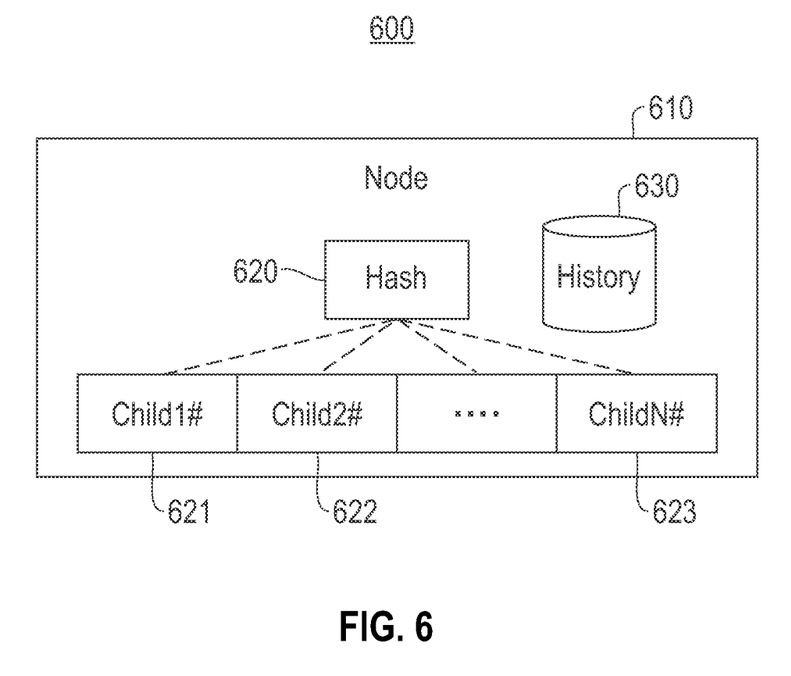
FIG. 6 is a block diagram illustrating a hash node data structure and hash elements, according to an embodiment.

FIG. 6 is a block diagram illustrating a data structure 600 for a hash node 610 and its hash elements, according to an embodiment. In the hash node 610, the hash value 620 includes a hash value for the node 610 and for the child node 1 621, child node 2 622 to child node n 623, where n is a positive integer. The history structure 630 maintains the history of status changes and the changes that lead up to the current status. In one embodiment, the hash value 620 represents the overall status of the node and is computed based on the status of the node 620 and its children nodes (child node 1 621, child node 2 622 to child node n 623). The hash value 620 is propagated to the upper node levels to inform the node(s) in the upper node level about any changes. In one embodiment, the history structure 630 contains the last value of the hash and the steps that led to it, where the last value allows to verify when a status change occurs; and the steps that led to the status change allow for backups and recovery. Additionally, the hash node 620 structure includes a list containing hash values of the children nodes, where each child node has an entry in this list that represents its status; a change of a child node status triggers the change of the entry; and an entry change triggers the re-computation of the hash value of the node.

In one embodiment, the hash value of a node is computed based on its local status and the aggregation of all the hashes of its children nodes. If the node is a leaf in the hash tree data structure, the hash value is computed based on its status context. In one example, if the node represents a switch device, its hash value may be computed based on its status (up or down). Each node maintains the history of its status changes in the history structure 630. In one embodiment, this tracking allows for efficient rollback strategies or disaster recovery. In one embodiment, whenever a status change occurs on a given node, the hash value 620 is re-computed; the new value is saved in the history structure 630 along with the action or event that led to this change. Afterwards, the new computed hash value is propagated to the upper node level by modifying the related element in the list containing the hash values of children nodes. This modification will trigger the re-computation of the hash value of the parent node. The modification is propagated recursively until it reaches the root node.

In one or more embodiments, providing the desired granularity of status changes per customer cloud environment reduces the time required to monitor devices in a cloud environment by using the overall hash tree data structure for a consumer or any sub-tree representing specific resources. One or more embodiments monitor any node in the hash tree data structure to detect the status changes of any device(s) that a customer may be interested in. If the hash value shows that there is no status change, there is no further need to traverse through the rest of the hash tree data structure to obtain monitoring data because it is already known that the status is the same as the previous monitoring tentative. The worst case is when all the nodes in the hash tree data structure changed. In this case, a traditional processing may be performed that includes visiting all the nodes and obtaining the changes of the resources. In all the other cases, one or more embodiments are very efficient since the number of visited nodes is reduced.

Figure 7:
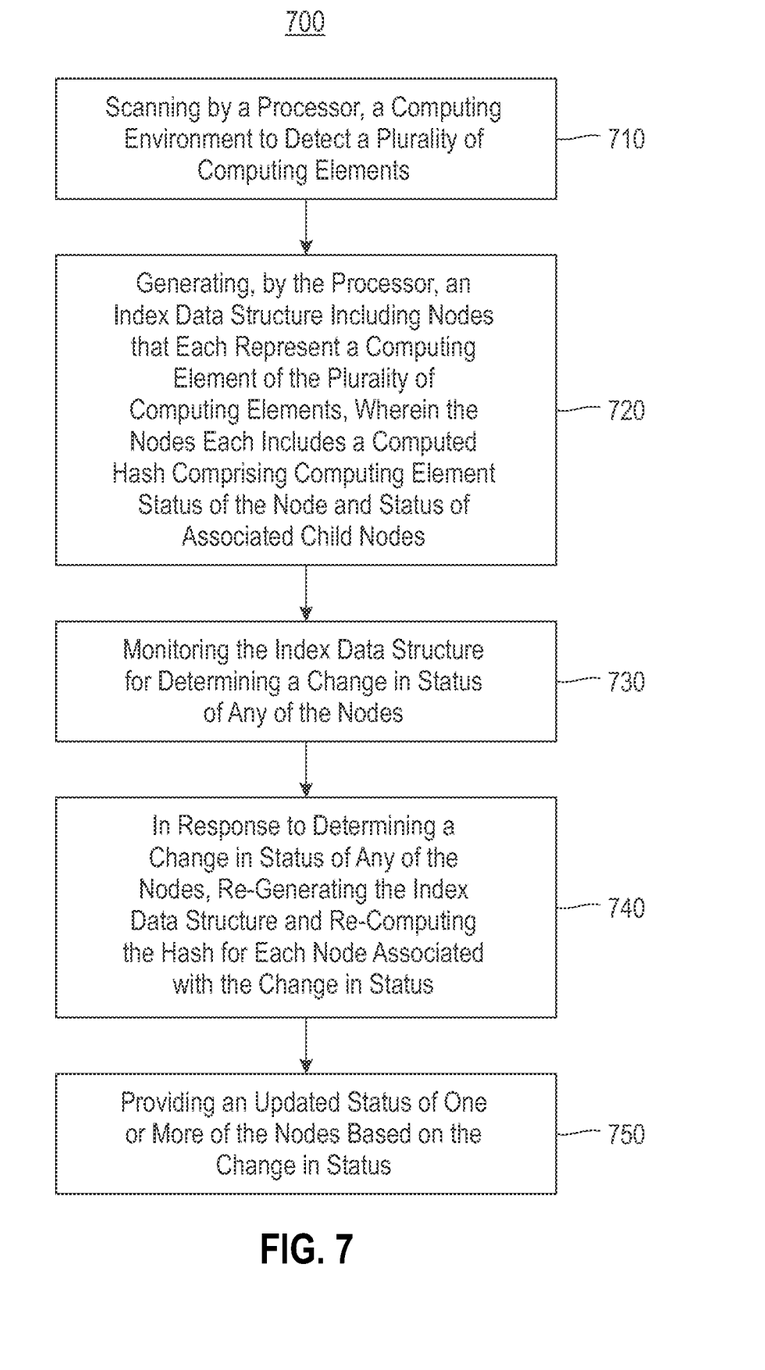
FIG. 7 illustrates a block diagram for a process for discovering and publishing device changes in a cloud computing environment, according to one embodiment.

FIG. 7 illustrates a block diagram for a process 700 for discovering and publishing device changes in a cloud computing environment according to one embodiment. In one embodiment, in block 710 a processor (e.g., a processor device, discovery processor 310, FIG. 3, etc.) scans a computing environment (e.g., cloud computing environment 50, FIG. 1, cloud environment 500, FIG. 5) to detect computing elements (e.g., computing devices and resources). In one embodiment, in block 720 a processor (e.g., a processor device, indexing processor 320, etc.) generates an index data structure (e.g., a hash tree data structure) including allocation of nodes that each represent a computing element of the computing environment. In one embodiment, the nodes each includes a computed hash value that includes computing element status of the node and status of associated child nodes. In one embodiment, in block 730, the index data structure is monitored (e.g., by a processor device, the monitoring processor 330, etc.) for discovering a change in status of any of the nodes. In one embodiment, in block 740, in response to determining a change in status (e.g., by a processor device, the change history processor 350, etc.) of any of the nodes, the index data structure is re-generated and the hash value for each node associated with the change in status is re-computed. In one embodiment, in block 750 an updated status of one or more of the nodes is provided (e.g., by a processor device, the publish and subscribe processor 340, etc.) based on the change in status.

In one embodiment, in process 700, each of the nodes further includes a history structure and a list of hash values of related child nodes. In one embodiment, process 700 may include propagating changes in status of any computing element between associated node levels of the index data structure using a REST API. In one embodiment, each propagation of a status change to an upper node level from a lower node level triggers a new computation of a hash value for any node in the upper node level.

In one embodiment, the computational elements comprise one or more servers, routers and switches. In one embodiment, monitoring the index data structure may further include tracking status changes of the computational elements. In one embodiment, providing the updated status of one or more of the nodes may further include publishing status change notifications based on a notification subscription or pulling status change notifications. In one embodiment, status change notifications may include any granularity of a node or level of nodes for the index data structure.

In one embodiment, index data structures for the cloud computing environment are generated for each customer of the cloud computing environment, and each customer is provided updated change status based on an associated index data structure. In one embodiment, process 700 may further include storing a last hash value and history of prior hash values that lead up to the last hash value in the history structure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   scanning, by a processor, a computing environment to detect a plurality of computing elements;
   generating, by the processor, an index data structure including allocation of nodes that each represent a computing element of the plurality of computing elements, wherein the nodes each includes a computed hash value comprising computing element status of the node and status of associated child nodes;
   monitoring the index data structure for discovering a change in status of any of the nodes;
   in response to determining a change in status of any of the nodes, re-generating the index data structure, re-computing the hash value for each node associated with the change in status, and propagating changes in status of any computing element between associated node levels of the index data structure using an application programming interface (API); and
   providing an updated status of one or more of the nodes based on the change in status.

2. The method of claim 1, wherein each of the nodes further includes a history structure and a list of hash values of related child nodes.

3. The method of claim 2, wherein
   the API is a representational state transfer (REST) API, and each propagation of a status change to an upper node level from a lower node level triggers a new computation of a hash value for any node in the upper node level.

4. The method of claim 3, wherein the computing environment is a cloud computing environment, and the computing elements comprise one or more servers, one or more routers and one or more switches.

5. The method of claim 4, wherein:
   monitoring the index data structure further comprises tracking status changes of the computational elements; and
   providing the updated status of one or more of the nodes comprises publishing status change notifications based on a notification subscription or pulling status change notifications.

6. The method of claim 5, wherein status change notifications may include any granularity of a node or level of nodes for the index data structure.

7. The method of claim 5, wherein index data structures for the cloud computing environment are generated for each customer of the cloud computing environment, and each customer is provided updated change status based on an associated index data structure.

8. The method of claim 5, further comprising:
   storing a last hash value and history of prior hash values that lead up to the last hash value in the history structure.

9. A computer program product for discovering and publishing device changes in a computing environment, the computer program product comprising a computer readable storage device having program instructions embodied therewith, the program instructions executable by a processor to cause the processor to:
   scan, by the processor, a computing environment to detect a plurality of computing elements;
   generate, by the processor, an index data structure including allocation of nodes that each represent a computing element of the plurality of computing elements, wherein the nodes each includes a computed hash value comprising computing element status of the node and status of associated child nodes;

monitor, by the processor, the index data structure to discover a change in status of any of the nodes;

in response to discovering a change in status of any of the nodes, re-generate, by the processor, the index data structure, re-compute, by the processor, the hash value for each node associated with the change in status, and propagate, by the processor, changes in status of any computing element between associated node levels of the index data structure using an application programming interface (API); and provide, by the processor, an updated status of one or more of the nodes based on the change in status.

10. The computer program product of claim 9, wherein each of the nodes further includes a history structure and a list of hash values of related child nodes.

11. The computer program product of claim 10, further comprising program instructions executable by the processor to cause the processor to:

store, by the processor, a last hash value and history of prior hash values that lead up to the last hash value in the history structure;

wherein:

the API is a representational state transfer (REST) API; and each propagation of a status change to an upper node level from a lower node level triggers a new computation of a hash value for any node in the upper node level.

12. The computer program product of claim 11, wherein the computing environment is a cloud computing environment, and the computing elements comprise one or more servers, one or more routers and one or more switches.

13. The computer program product of claim 11, wherein:

monitoring the index data structure further comprises program instructions executable by the processor to cause the processor to:

track, by the processor, status changes of the computational elements; and providing the updated status of one or more of the nodes further comprises program instructions executable by the processor to cause the processor to:

publish, by the processor, status change notifications based on a notification subscription or provide status change notifications for pulling.

14. The computer program product of claim 12, wherein:

status change notifications may include any granularity of a node or level of nodes for the index data structure; and index data structures for the cloud computing environment are generated for each customer of the cloud computing environment, and each customer is provided updated change status based on an associated index data structure.

15. An apparatus comprising:

a discovery processor configured to scan a computing environment to detect a plurality of computing devices;

an indexing processor configured to generate an index data structure including allocation of nodes that each represent a computing device of the plurality of computing devices, wherein the nodes each includes a computed hash value comprising computing device status of the node and status of associated child nodes;

a monitoring processor configured to monitor the index data structure to discover a change in status of any of the nodes;

a change history processor configured to:
re-generate the index data structures;
re-compute the hash value for each node associated with a change in status for any of the nodes; and
propagate changes in status of any computing device between associated node levels of the index data structure using an application programming interface (API); and a publish and subscribe processor configured to provide an updated status of one or more of the nodes based on the change in status for any of the nodes.

16. The apparatus of claim 15, wherein each of the nodes further includes a history structure and a list of hash values of related child nodes.

17. The apparatus of claim 16, wherein:

the API is a representational state transfer (REST) API;

each propagation of a status change to an upper node level from a lower node level triggers a new computation of a hash value for any node in the upper node level; and the change history processor is further configured to store a last hash value and history of prior hash values that lead up to the last hash value in the history structure.

18. The apparatus of claim 17, wherein the computing environment is a cloud computing environment, and the computing devices comprise one or more servers, one or more routers and one or more switches.

19. The apparatus of claim 18, wherein:

the monitoring processor is configured to track status changes of the computational devices; and the publish and subscribe processor is configured to publish status change notifications based on a notification subscription or to provide status change notifications for pulling.

20. The apparatus of claim 19, wherein:

status change notifications may include any granularity of a node or level of nodes for the index data structure;

the indexing processor is configured to generate index data structures for each customer of the cloud computing environment; and the publish and subscribe processor is configured to provide updated change status based on an associated index data structure to each customer of the cloud computing environment.

* * * * *